United States Patent
Tsai

(10) Patent No.: US 11,673,326 B2
(45) Date of Patent: Jun. 13, 2023

(54) THREE DIMENSIONAL PRINTING APPARATUS

(71) Applicant: Young Optics Inc., Hsinchu (TW)

(72) Inventor: Chien-Hsing Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 875 days.

(21) Appl. No.: 16/689,096

(22) Filed: Nov. 20, 2019

(65) Prior Publication Data
US 2020/0298485 A1    Sep. 24, 2020

(30) Foreign Application Priority Data
Mar. 22, 2019   (TW) .................................. 108110133

(51) Int. Cl.
| B29C 64/245 | (2017.01) |
| B29C 64/223 | (2017.01) |
| B33Y 30/00  | (2015.01) |
| B29C 64/264 | (2017.01) |

(52) U.S. Cl.
CPC .......... B29C 64/245 (2017.08); B29C 64/223 (2017.08); B29C 64/264 (2017.08); B33Y 30/00 (2014.12)

(58) Field of Classification Search
None
See application file for complete search history.

(56) References Cited

U.S. PATENT DOCUMENTS

| 2013/0001834 A1* | 1/2013 | El-Siblani ............. B29C 64/124 |
| | | 264/401 |
| 2013/0292862 A1  | 11/2013 | Joyce |
| 2014/0191442 A1* | 7/2014 | Elsey ..................... B29C 64/223 |
| | | 264/401 |
| 2015/0298396 A1* | 10/2015 | Chen ...................... B29C 64/255 |
| | | 425/110 |
| 2016/0046071 A1* | 2/2016 | Kuhnlein ................. B29C 64/40 |
| | | 425/174.4 |
| 2016/0136902 A1* | 5/2016 | Stadlmann .............. B29C 64/40 |
| | | 425/470 |
| 2017/0182716 A1* | 6/2017 | Wu ........................ B29C 64/245 |
| 2017/0217052 A1* | 8/2017 | Wu ......................... B29C 33/68 |
| 2017/0297261 A1  | 10/2017 | Schultheiss et al. |
| 2018/0029296 A1* | 2/2018 | Van Esbroeck ....... B29C 64/286 |

FOREIGN PATENT DOCUMENTS

TW          201722693          7/2017

OTHER PUBLICATIONS

"Office Action of Taiwan Counterpart Application", dated Apr. 9, 2020, p. 1-p. 10.

* cited by examiner

Primary Examiner — Timothy Kennedy
(74) Attorney, Agent, or Firm — JCIPRNET

(57) ABSTRACT

A three dimensional printing apparatus includes a carrier, a glass plate and a film. The glass plate is disposed on the carrier. The film covers the glass plate and is folded over an edge of the carrier. An interface between the glass plate and the film is in communication with the external space via a channel between the edge and the sidewall of the glass plate.

17 Claims, 5 Drawing Sheets

THREE DIMENSIONAL PRINTING APPARATUS

CROSS-REFERENCE TO RELATED APPLICATION

This application claims the priority benefit of Taiwan application serial no. 108110133, filed on Mar. 22, 2019. The entirety of the above-mentioned patent application is hereby incorporated by reference herein and made a part of this specification.

BACKGROUND OF THE INVENTION

1. Field of the Invention

The invention relates to a three-dimensional printing apparatus, and particularly relates to a three-dimension printing apparatus having a vacuum releasing structure.

2. Description of Related Art

In a conventional photocuring three-dimensional printing apparatus, the bottom of an accommodating sink for accommodating a curable glue has a film and a glass plate for supporting the film. During the process of printing a workpiece, the curable glue is irradiated by a light source and then cured on a platform to form one of the layers of the workpiece. In order to go on to print the next layer of the workpiece, the platform is elevated, and an oblique force is applied to a place where the film and the workpiece contact each other by making use of the restoring force of the deformable film, thereby making it easier to detach the film from the workpiece. However, the space between the film and the glass plate is a vacuum space, so it is not easy to detach the film from the glass plate.

To solve this issue, in the conventional art, a closed through-hole is drilled on the glass plate, so that air enters the space between the glass plate and the film from one end of the glass plate, thereby making it easier to detach the film from the glass plate. However, drilling the closed through-hole on the glass plate may damage the glass plate and thus increase the manufacturing cost. Therefore, how to lower the risk of damaging the glass plate to prevent the manufacturing cost from being increased while being able to separate the glass plate and the film has become one of the important issues that people having ordinary skills in the art work on.

SUMMARY OF THE INVENTION

The invention provides a three-dimensional printing apparatus allowing an external fluid to enter between a film and a glass plate under a premise of maintaining the strength of a glass plate and not increasing the manufacturing cost.

An embodiment of the invention provides a three-dimensional printing apparatus including a carrier, a glass plate, and a film. The glass plate is disposed on the carrier. The film covers the glass plate and is folded over an edge of the carrier. An interface between the glass plate and the film is in communication with the external space via a channel between the edge and the sidewall of the glass plate.

Another embodiment of the invention provides a three-dimensional printing apparatus including a carrying plate, a transparent plate, and an elastic film. The transparent plate is disposed on the carrying plate. An elastic film is disposed on the transparent plate. A gap is provided between the carrying plate and the transparent plate. The elastic film is in communication with an external space through the gap.

Based on the above, in the design of the three-dimensional printing apparatus according to the embodiments of the invention, the interface between the glass plate and the film may be in communication with the external space through the channel located between the edge of the carrier and the sidewall of the glass plate. In other words, the three-dimensional printing apparatus according to the embodiments of the invention allows an external fluid to enter between the film and the glass plate without drilling a hole on the glass plate. Therefore, the strength of the glass can be maintained, and the manufacturing cost is not increased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
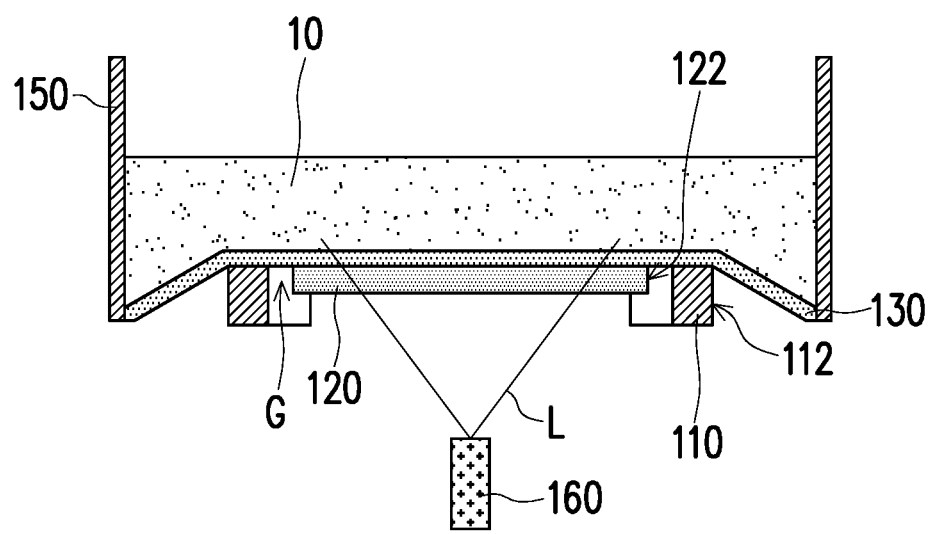
FIG. 1A is a schematic view illustrating a three-dimensional printing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
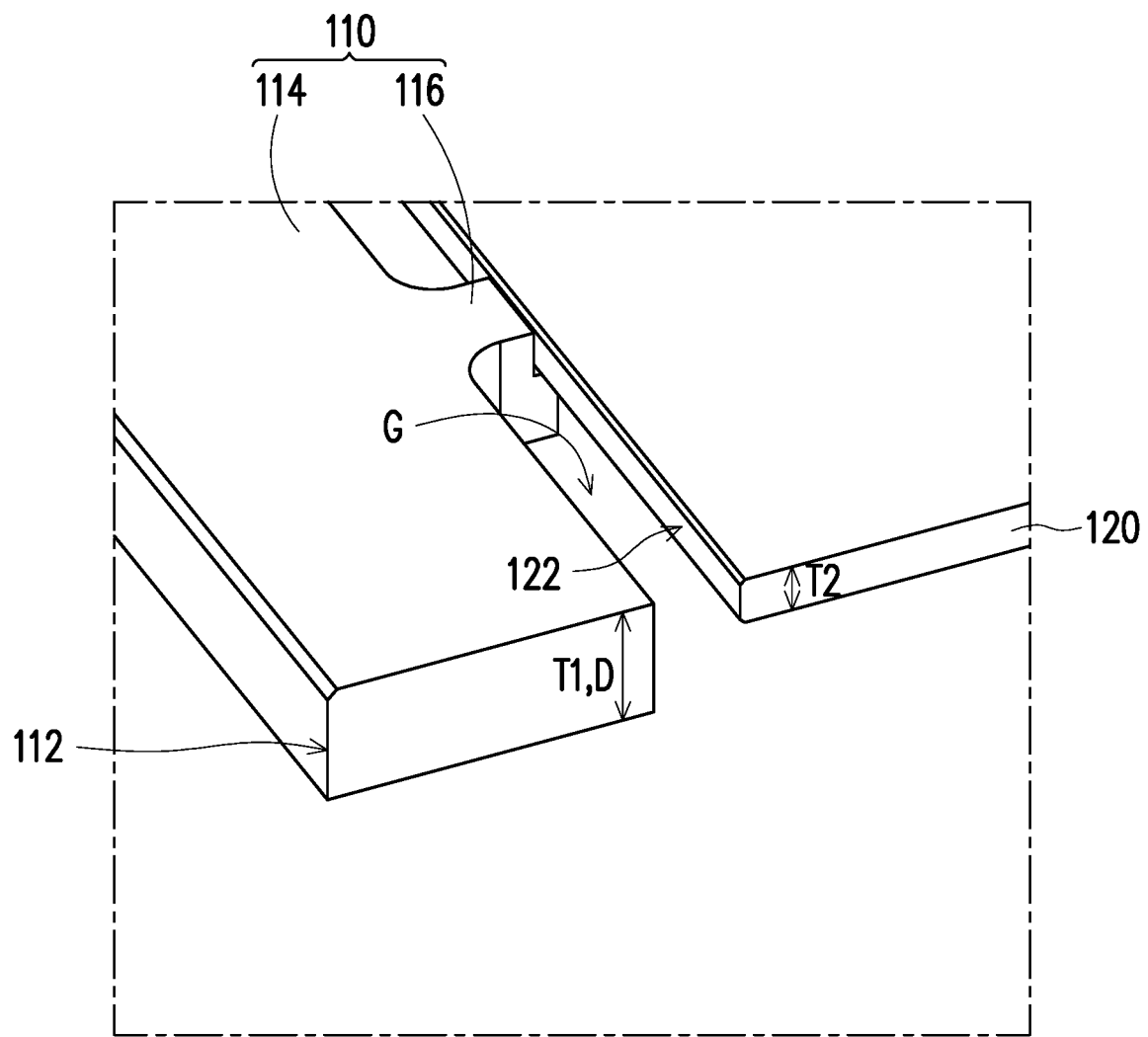
FIG. 1B is a schematic perspective cross-sectional view illustrating some components of the three-dimensional printing apparatus of FIG. 1A.
Figure 1C:
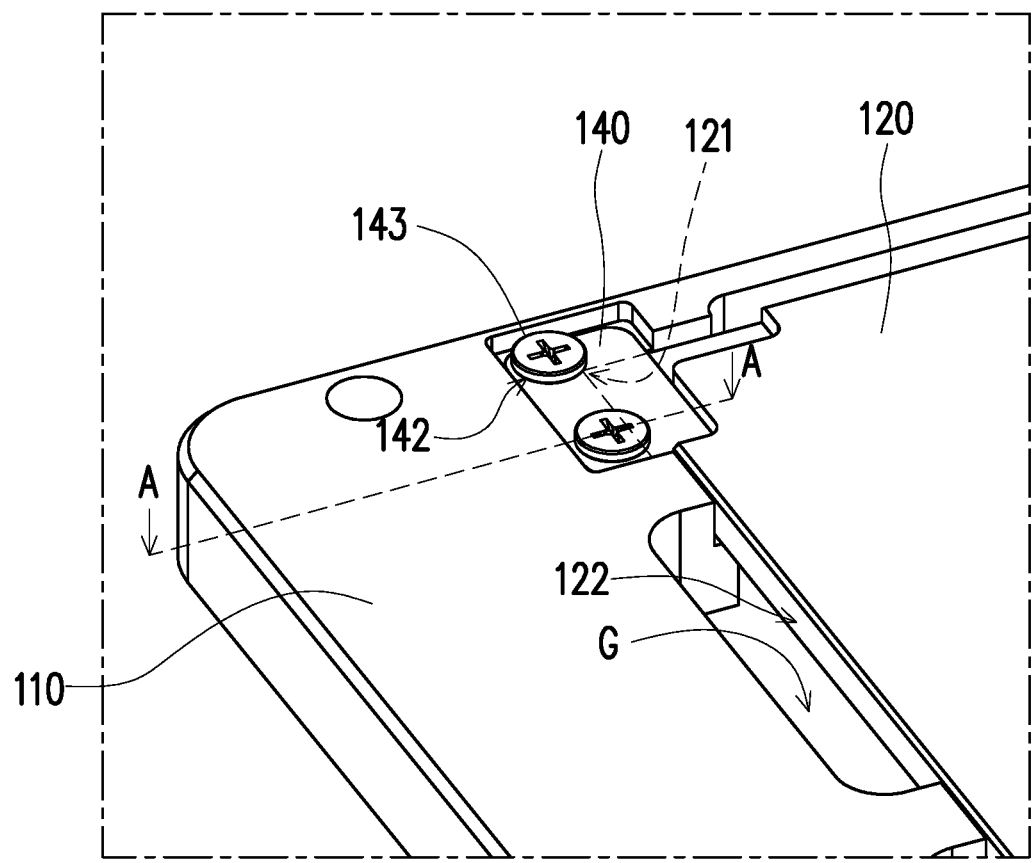
FIG. 1C is a schematic perspective top view illustrating some components of the three-dimensional printing apparatus of FIG. 1A.
Figure 1D:
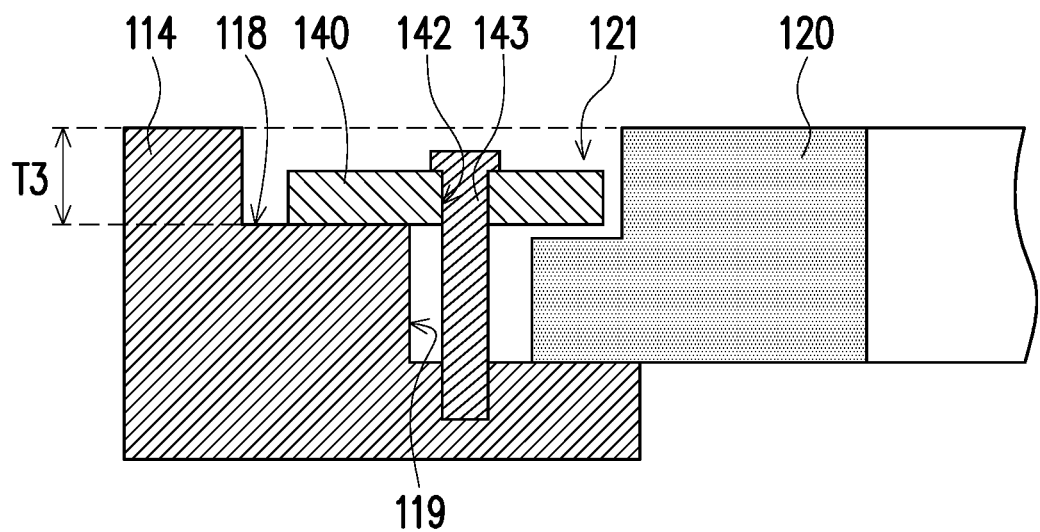
FIG. 1D is a schematic cross-sectional view along a line A-A of FIG. 1C.
Figure 2:
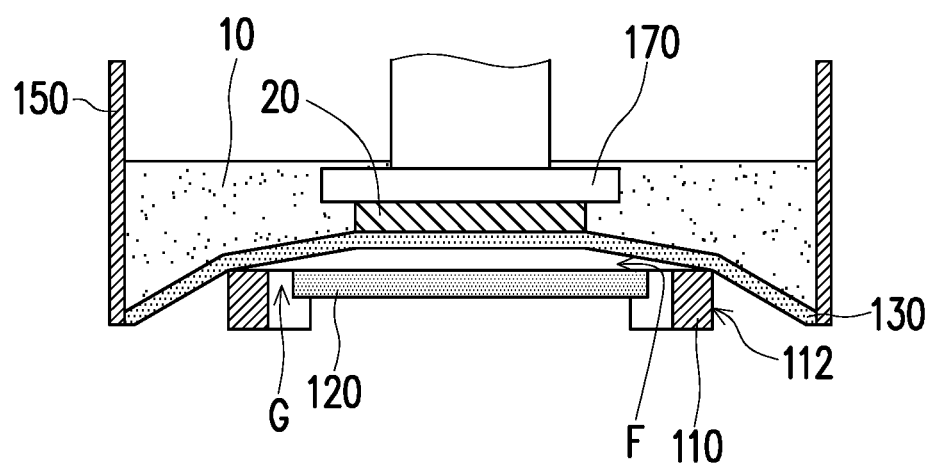
FIG. 2 is a schematic view illustrating separating a workpiece in an accommodating sink of FIG. 1A from a film.

FIG. 1A is a schematic view illustrating a three-dimensional printing apparatus according to an embodiment of the invention. FIG. 1B is a schematic perspective cross-sectional view illustrating some components of the three-dimensional printing apparatus of FIG. 1A. FIG. 1C is a schematic perspective top view illustrating some components of the three-dimensional printing apparatus of FIG. 1A. FIG. 1D is a schematic cross-sectional view along a line A-A of FIG. 1C. FIG. 2 is a schematic view illustrating separating a workpiece in an accommodating sink of FIG. 1A from a film. It should be noted that, while FIGS. 1B and 1C are drawn based on the actual proportional relationship according to an embodiment of the invention, FIGS. 1A, 1D, and 2 of the invention are not drawn according to the actual proportional relationship but are modified with respect to the proportional relationship of FIGS. 1B and 1C in order to highlight the features.

Referring to FIGS. 1A, 1B, 1C, and 2, in the embodiment, a three-dimensional printing apparatus 100 includes a carrier 110, a transparent plate 120, a film 130, a channel G, a pressing piece 140, a connecting piece 143, a sink 150, an image light source 160, and a curing platform 170.

The carrier 110 is provided with an edge 112 and has a vertical thickness T1. In the embodiment, the carrier 110 may be formed by assembling one or more plate bodies, and may include a carrying plate. For example, a main body 114 shown in the drawings is an example of the carrying plate. The carrier 110 may serve to carry an object. The carrier 110 may be in various different shapes. As shown in the drawings, the outer profile of the carrier 110 may be substantially rectangular and plate-like. Besides, the carrier 110 includes the main body 114, and the inner side of the main body 114 is hollow and rectangular annular. A plurality of protruding structures 116 are disposed on an inner sidewall of the main body 114 facing toward the hollow side, and each of the protruding structures 116 is formed by horizontally extending toward a normal vector direction of the inner sidewall. Each of the protruding structures 116 is formed as a stepped structure having an upper step and a lower step. As shown in the drawings, the upper surface of the lower step may be a substantially horizontal plane and may serve as a carrying surface and define the height of a carried object, and the side surface of the upper step may also be a substantially vertical plane and may serve to define the horizontal position of the carried object. In the embodiment, each of the protruding structures 116 is formed as one piece with the main body 114. However, the invention is not limited thereto. Depending on the needs, each of the protruding structures 116 may be optionally formed as one piece with, adhered to, or fit with the inner sidewall of the main body 114 of the carrier 110, or fixed to the inner sidewall of the main body 114 of the carrier 110 by other chemical or mechanical means.

Referring to FIGS. 1B and 1C, a gap is provided between the carrier 110 and the transparent plate 120. In addition, the gap is in communication with upper and lower surfaces of the transparent plate 120 and may serve as the channel G for a fluid F such as air to flow through. In the embodiment, the channel G formed by the gap of the carrier 110 has a vertical depth D at least greater than a thickness T2 of the transparent plate 120, so as to allow the fluid to flow through on two sides of the transparent plate 120. In the embodiment, the channel G is, for example, an elongated strip-shaped through-hole extending along the horizontal direction, and each of the protruding structures 116 is respectively disposed on the inner sidewall of the through-hole. However, in other embodiments not shown herein, the channel may also be in a semi-cylindrical shape, a square column shape, or other three-dimensional shapes. The invention does not intend to impose a limitation on this regard. Besides, the channel may be a homogeneous space as previously described, a gradually reduced space, a gradually increased space, or a combination of the aforementioned states. Besides, a recessed platform 118 may be respectively provided on each corner of the carrier 110. The recessed platform 118 is formed by forming a downward recess along the vertical direction on an upper surface of the main body 114, and has a depth of T3. The recessed platform 118 has a profile of a rectangular groove. A plurality of screw holes 119 are formed on the surface of the recessed platform 118. However, the invention is not limited to having the recessed platform. An adhesive layer may be additionally disposed between the protruding structure 116 and the transparent plate 120 to fix the positions thereof and replace or reinforce the recessed platform.

The transparent plate 120 is a plate material allowing a specific ray to pass through and having sufficient structural strength. In the embodiment, the transparent plate 120 is formed of a glass material having a high UV transmittance. In other words, the transparent plate 120 in the embodiment is a glass plate. However, the material of the transparent plate 120 is not limited to glass, but may also be formed of a transmissive polymer material, such as a resin or a plastic material. The vertical thickness of the transparent plate 120 is T2. In the embodiment, the vertical thickness T2 is about 5 millimeters. In the embodiment, the transparent plate 120 has a stepped structure at a corner 121. The stepped structure includes a lower step and an upper step. The upper surface of the lower step is a substantially horizontal plane, while the side surface of the upper step is a substantially vertical plane. When a total transmittance of the transparent plate 120 with respect to a ray having a wavelength of 365 nm is higher than 40%, 60%, 75%, and 90%, the system overall light performance may respectively be normal, good, excellent, and optimal. In the embodiment, the total transmittance of the transparent plate 120 with respect to a ray having a wavelength of 365 nm is 75% or more. Besides, in the embodiment, the entire transparent plate 120 does not have a closed through-hole. For example, if a side edge of the transparent plate 120 is processed and the transparent plate 120 is drilled through to form a recess on the sidewall of the transparent plate 120, such a recess is a through-hole but is not a closed hole. Alternatively, if a recess is created at the center of the transparent plate 120 but the recess does not penetrate through the transparent plate 120, such a recess is a closed hole but is not a through-hole.

The film 130, also called a release film, is a flexible film formed of a flexible property, and is a type of elastic membrane. In addition, the film 130 is light transmissive and allows visible light or invisible light to pass through. When a total transmittance of the film 130 with respect to a ray having a wavelength of 365 nm is higher than 40%, 60%, 75%, and 90%, the system overall light performance may respectively be normal, good, excellent, and optimal. In the embodiment, the total transmittance of the film 130 with respect to a ray having a wavelength of 365 nm is 75% or more. The film 130 also exhibits low surface adhesiveness, for example. For example, the material of the film 130 may include silicone rubber or polytetrafluoroethylene (PTFE). However, the invention is not limited thereto.

The pressing piece 140 (may also be referred to as a baffle plate) has a through-hole 142. The pressing piece 140 is a rectangular plate, for example, and may be formed of a rigid material or a material exhibiting a certain degree of elasticity. In the embodiment, the pressing piece 140 may be an elastic metal reed and serves to limit the movable range or the position of the transparent plate 120. In the embodiment, the through-hole 142 may be a circular hole, an elliptical hole, or a polygonal hole, and the inner circumference of each through-hole 142 may be optionally a smooth surface or threaded.

The connecting piece 143 is, for example, a machine part or machine member having a connection function, such as a screw, a guide rod, etc., and may lock the pressing piece 140 onto the recessed platform 118 on the first side of the carrier 110.

The sink 150 may be an accommodating sink, for example, and may serve to accommodate a photocurable material 10. In the embodiment, the sink 150 may be a one-piece structure, and the sink 150 is approximately a rectangular sink. Of course, in other embodiments, the sink 150 may also be formed by a plurality of side boards. The photocurable material 10 may be in a liquid state, a gel state, a fluid state, a powder state, etc. The invention does not intend to impose a limitation on this regard. Due to material properties, the photocurable material 10 may form a workpiece 20 after being cured through light irradiation.

The image light source 160 serves to provide an image beam L. The image light source 160 may be, for example, a digital light processing (DLP) projection apparatus, a liquid crystal on silicon (LCOS) projection apparatus, a liquid crystal projection apparatus, or a scanning laser projection apparatus, and the light emitting device that is adopted may be a light emitting diode (LED), a laser device, or other suitable light emitting devices. Besides, the wavelength range of the ray provided by the light emitting device needs to be matched with a liquid photosensitive material. For example, if the liquid photosensitive material is a UV curable material, an UV light emitting device needs to be chosen as the light emitting device. In the embodiment, the image light source 160 is a DLP projector whose light source emits UV light.

The platform 170 (also called a curing platform) and the transparent plate 120 are disposed on two opposite sides of the film 130, and the platform 170 is movable in a vertical direction away from or toward the film 130. After being cured through light irradiation, the photocurable material 10 forms the workpiece 20, and the workpiece 20 may be formed layer by layer on the platform 170.

Regarding the application, referring to FIGS. 1A, 1B, and 2, the vertical thickness T1 of the main body 114 of the carrier 110 of the embodiment is greater than the vertical thickness T2 of the transparent plate 120. When T2/T1 is equal to or lower than 0.9, 0.6, 0.4, and 0.2, the stability is respectively normal, good, excellent, and optimal. In the embodiment, T2/T1 is about 0.3. The carrier 110 serves to carry the transparent plate 120. In other words, the transparent plate 120 is disposed on the carrier 110, and after the transparent plate 120 is disposed on the carrier 110, the film 130 renders a favorable attachment effect when the upper surface of the transparent plate 120, the upper surface of the protruding structure 116 of the carrier 110, and the upper surface of the main body 114 of the carrier 110 are substantially coplanar. However, the invention is not limited thereto. Depending on the needs, a step difference may be provided between the upper surface of the transparent plate 120 and the upper surface of the main body 114. The transparent plate 120 may have a range of height from protruding 10% of T2 to being recessed 100% of T2 from the upper surface of the main body 114. In the embodiment, the transparent plate 120 has a height of protruding about 0.1 millimeters, which is about 4% of T2, from the upper surface of the main body 114. The film 130 covers the transparent plate 120 and is folded over an edge 112 of the carrier 110. The interface between the transparent plate 120 and the film 130 is in communication with the external space through the channel G between the edge 112 and the sidewall 122 of the transparent plate 120. In other words, a gap is provided between the carrier 110 and the transparent plate 120, and the film 130 is in communication with the external space through the gap. Therefore, the fluid F in the external space may enter between the transparent plate 120 and the film 130 through the channel G between the carrier 110 and the transparent plate 120. Herein, a depth D of the channel G is greater than the thickness T2 of the transparent plate 120.

To further position the transparent plate 120, the pressing piece 140 of the three-dimensional printing apparatus 100 of the embodiment is disposed on the first side of the carrier 110 and covers at least a portion of the transparent plate 120, as shown in FIGS. 1C and 1D. The pressing piece 140 is suitable for limiting the position of the transparent plate 120 relatives to the carrier 110. In the embodiment, the pressing piece 140 is locked to the corner 121 of the transparent plate 120. The corner 121 of the transparent plate 120 is located between the pressing piece 140 and the carrier 110, and the connecting piece 143 locks the pressing piece 140 into the recessed platform 118 on the first side of the carrier 110. In other words, the connecting piece 143 locks the pressing piece 140 on the carrier 110 through the through-hole 142 of the pressing piece 140. Accordingly, when the vacuum between the film 130 and the transparent plate 120 is not released and the transparent plate 120 is therefore sucked up together during a printing process, the pressing piece 140 may limit the vertical position of the transparent plate 120 to prevent the transparent plate 120 from being sucked up over a predetermined distance. The distance may be determined by controlling the initial distance between the transparent plate 120 and the pressing piece 140. If the pressing piece 140 is initially in contact with and fixes the transparent plate 120, the distance in which the transparent plate 120 is sucked up is zero. Since a depth T3 of the recessed platform 118 of the embodiment is less than a thickness of a portion of the corner 121 of the transparent plate 120, after the connecting piece 143 is locked up through the through-hole 142, the entirety of the connecting piece 143 does not protrude from the recessed platform 118, i.e., not protruding from the upper surface of the main body 114, so as to prevent the connecting piece 143 from damaging the film 130.

Referring to FIGS. 1A and 2 again, the sink 150 is disposed on the transparent plate 120, and the film 130 separates the transparent plate 120 and the sink 150. The image light source 160 is disposed upstream of the light path of the transparent plate 120, and the image light source 160 is capable of providing the image beam L toward the transparent plate 120. After the image beam L provided by the image light source 160 penetrates through the transparent plate 120 and the film 130 and irradiates the photocurable material 10, the photocurable material 10 is cured and forms the workpiece 20. Therefore, the workpiece 20 is attached to the platform 170. Then, the platform 170 may elevate the workpiece 20, so that the fluid F in the external space enters between the transparent plate 120 and the film 130 through the channel G. Accordingly, a low-pressure phenomenon between the film 130 and the transparent plate 120 is eliminated, and the pressures on two sides of the film 130 are balanced. The pulling force required for elevating the workpiece 20 only needs to overcome the adhesive force between the workpiece 20 and the film 130 to separate the workpiece 20 from the film 110. Accordingly, the photocurable material 10 is filled between the workpiece 20 and the film 130 and the printing process for the next layer may be performed.

Since the channel G in communication with the external space is provided between the edge 112 of the carrier 110 and the sidewall 120 of the transparent plate 120 in the embodiment, the structure and the strength of the transparent plate 120 are not damaged in the embodiment. Therefore, the fluid F in the external space may enter between the transparent plate 120 and the film 130 through the channel G, thereby eliminating the low pressure phenomenon between the film 130 and the transparent plate 120 and maintaining the strength of the transparent plate 120 without increasing the manufacturing cost. In general, an embodiment of the invention provides a design in which the channel G is provided between the carrier 110 and the transparent plate 120 to allow a fluid to flow through and thereby release the vacuum between the film 130 and the transparent plate 120. In an embodiment, the channel G is formed by recessing the carrier 110. However, the invention is not limited thereto. Depending on needs, the channel G may also be formed by processing the edge of the transparent plate 120 to form an opening groove penetrating through the upper and lower surfaces thereof, so as to achieve a similar vacuum releasing effect under the premise of not significantly affecting the strength of the transparent plate 120.

In view of the foregoing, in the design of the three-dimensional printing apparatus according to the embodiments of the invention, the interface between the glass plate and the film may be in communication with the external space through the channel located between the edge of the carrier and the sidewall of the glass plate. In other words, the three-dimensional printing apparatus according to the embodiments of the invention allows an external fluid to enter between the film and the glass plate without drilling a hole on the glass plate. Therefore, the strength of the glass can be maintained, and the manufacturing cost is not increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional printing apparatus, comprising:
   a carrier;
   a glass plate, disposed on the carrier;
   a film, covering the glass plate and folded over an edge of the carrier, wherein an interface between the glass plate and the film is in communication with an external space through a channel located between the edge and a sidewall of the glass plate, wherein the carrier comprises a carrying plate, the glass plate is a transparent plate, the film is an elastic film, and the channel is a gap between the glass plate and the carrier; and
   an accommodating sink disposed on the transparent plate, wherein the elastic film separates the transparent plate and the accommodating sink.

2. The three-dimensional printing apparatus as claimed in claim 1, wherein a thickness of the carrying plate is greater than a thickness of the transparent plate.

3. The three-dimensional printing apparatus as claimed in claim 1, wherein the carrying plate comprises:
   a main body, having a through-hole; and
   a plurality of protruding structures, wherein each of the protruding structures is respectively disposed on an inner sidewall of the through-hole.

4. The three-dimensional printing apparatus as claimed in claim 3, wherein the gap is located between the protruding structures.

5. The three-dimensional printing apparatus as claimed in claim 4, further comprising:
   an image light source, disposed upstream of a light path of the transparent plate and capable of providing an image beam toward the transparent plate.

6. The three-dimensional printing apparatus as claimed in claim 1, further comprising:
   a baffle plate, disposed on a first side of the carrying plate and covering at least a portion of the transparent plate, wherein the baffle plate is capable of limiting a position of the transparent plate relative to the carrying plate.

7. The three-dimensional printing apparatus as claimed in claim 6, further comprising:
   a connection piece, locking the baffle plate to a recessed platform on the first side of the carrying plate, wherein an entirety of the connecting piece does not protrude from the recessed platform.

8. The three-dimensional printing apparatus as claimed in claim 1, wherein a total transmittance of the transparent plate with respect to a ray having a wavelength of 365 nm is greater than 75%, and an entirety of the transparent plate does not have a closed through-hole.

9. A three-dimensional printing apparatus, comprising:
   a carrying plate;
   a transparent plate, disposed on the carrying plate;
   an elastic film, disposed on the transparent plate, wherein a gap is provided between the carrying plate and the transparent plate, and the elastic film is in communication with an external space through the gap; and
   an accommodating sink disposed on the transparent plate, wherein the elastic film separates the transparent plate and the accommodating sink.

10. The three-dimensional printing apparatus as claimed in claim 9, wherein a thickness of the carrying plate is greater than a thickness of the transparent plate.

11. The three-dimensional printing apparatus as claimed in claim 9, wherein the carrying plate comprises:
    a main body, having a through-hole; and
    a plurality of protruding structures, wherein each of the protruding structures is respectively disposed on an inner sidewall of the through-hole.

12. The three-dimensional printing apparatus as claimed in claim 11, wherein the gap is located between the protruding structures.

13. The three-dimensional printing apparatus as claimed in claim 12, further comprising:
    an image light source, disposed upstream of a light path of the transparent plate and capable of providing an image beam toward the transparent plate.

14. The three-dimensional printing apparatus as claimed in claim 9, further comprising:
    a baffle plate, disposed on a first side of the carrying plate and covering at least a portion of the transparent plate, wherein the baffle plate is capable of limiting a position of the transparent plate relative to the carrying plate.

15. The three-dimensional printing apparatus as claimed in claim 14, further comprising:
    a connection piece, locking the baffle plate to a recessed platform on the first side of the carrying plate, wherein an entirety of the connecting piece does not protrude from the recessed platform.

16. The three-dimensional printing apparatus as claimed in claim 9, wherein a total transmittance of the transparent plate with respect to a ray having a wavelength of 365 nm is greater than 75%, and an entirety of the transparent plate does not have a closed through-hole.

17. The three-dimensional printing apparatus as claimed in claim 9, wherein the elastic film is a release film, and a total transmittance of the film with respect to a ray having a wavelength of 365 nm is 75% or more.

* * * * *